Aug. 5, 1924.　　　　　　　　　　　　　　　　　1,503,997
J. PERRET
PROTECTIVE DEVICE FOR ALTERNATING CURRENT SYSTEMS
Filed Aug. 2, 1921

Patented Aug. 5, 1924.

1,503,997

UNITED STATES PATENT OFFICE.

JOSEPH PERRET, OF PARIS, FRANCE, ASSIGNOR, BY MESNE ASSIGNMENTS, TO SOCIETE ANONYME FORGES & ATELIERS DE CONSTRUCTIONS ELECTRIQUES DE JEUMONT, OF PARIS, FRANCE.

PROTECTIVE DEVICE FOR ALTERNATING-CURRENT SYSTEMS.

Application filed August 2, 1921. Serial No. 489,247.

*To all whom it may concern:*

Be it known that I, JOSEPH PERRET, citizen of the Republic of France, residing at Paris, France, have invented certain new and useful Protective Devices for Alternating-Current Systems, of which the following is a specification.

This invention relates to protective devices for alternating current net works.

This invention further relates to arrangements of that nature which automatically oppose the excess voltages which develop between earth and windings in alternating current system when one of the line wires comes in contact with the earth.

When such an accident takes place a circuit is established comprising an inductance and a capacity in which the voltage of the alternator is free to act.

In this circuit a self inductance is formed by the line wire being earthed; the capacity is that of the net work, cables, windings, etc., with reference to the earth, and the active voltage is the voltage between the terminals and the neutral point of the alternator.

Figure 1:
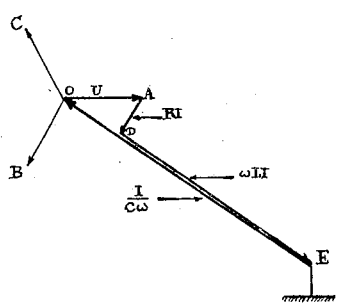
Figure 2:
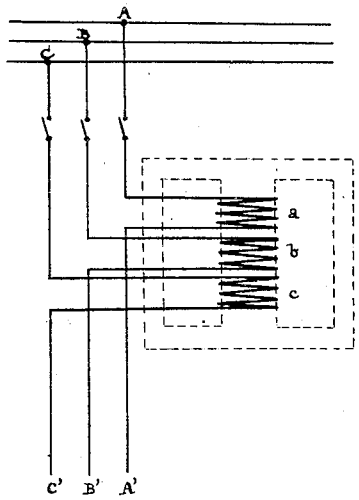
Figure 3:
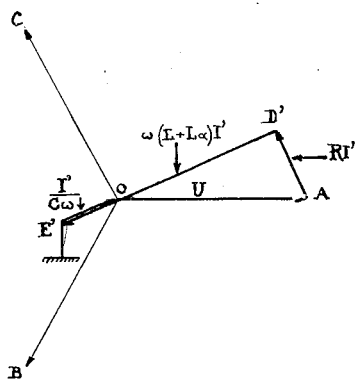

In certain cases, particularly in net works having iron armoured cables as has been shown by Mr. Boucherot in a study of this phenomenon, considerable excess voltages can be developed by the relation between the inductance and the capacity; resonance of the fundamental wave is above all to be feared. Fig. 1 is a diagram showing the development of excess voltage in normal alternating current net works. Fig. 2 shows diagrammatically as an example the arrangement of the present invention applied to a three phase system. Fig. 3 shows the modified vector diagram of the excess voltage with the arrangement of the present invention as compared with Fig. 1.

An examination of the diagram of Fig. 1 of the annexed drawing shows how this excess voltage is developed.

The generating source, assume 3 phase, is represented by three vectors OA, OB, OC, representing the voltages of the three phases between the neutral point and the terminals. It is assumed that one of the wires becoming separated from the terminal A is earthed at a point such that the inductance of the conductor between the terminal and the point of earthing has a value L; also C the capacity of the net work in relation to the earth and R the ohmic resistance of the inductance-capacity circuit as determined by the earthing. The diagram of the voltages in the circuit is represented in Fig. 1 by the line O. A. D. E. O. in which:—

OA is the voltage of the generator.
$Ad = RL$ is the ohmic drop.
$DE = \omega LI$ is the inductive drop.
$EO = \dfrac{I}{C\omega}$ is the capacity drop.

It may be seen on this diagram that the neutral point of the alternator in consequence of the accident is raised to a potential measured by the vector OE, which, according to the particular case can be several times greater than the vector OA.

The value of the vector OE can be found easily as a function of the constants of the circuit and of the voltage U of the alternator as below $$OE = \dfrac{U}{\sqrt{(1-\omega^2 LC)^2 + (\omega CR)^2}}$$

and it is seen immediately that this excess voltage depends essentially on the relative values of the inductance and the capacity.

One method of decreasing this excess voltage would be to increase L or C in such a way that the term $\omega^2 LC$ will become great relatively to unity.

It would be difficult and costly to increase a capacity of the net work in a sufficient proportion, besides the value of L is variable according to the position of the earthing point.

A better way appears to be in the addition of an additional inductance at the end of each line wire, but a value would have to be given to this inductance relatively big and its influence would be injurious to the distribution.

According to this invention an arrangement is made which results in the introduction in series with the earthed wire of an additional inductance of great value at that instant only when the earthing accident takes place whilst in normal balanced working this inductance is automatically cut out by the mutual inductance of the currents of the different phases.

Fig. 2 of the drawings shows as an example, the arrangement of this self inductance applied to a feeder for the protection of a three phase system.

According to the invention each of the three wires from the bus bars A. B. C. is coiled on a core of the same transformer of the shell type, the wires A', B', C' being connected to any form of apparatus in the system, for example a generator, motor, transformer, converter or the like; the three windings $a$, $b$, $c$, have the same number of turns and are connected in such a way that in normal working the ampere turns in the three windings mutually balance one another.

By reason of this combination the transformer offers to the passage of the current only a very feeble reactance this reactance being due to iron loss which does not influence the distribution. But if one of the conductors becomes earthed the capacity current of the net work will all pass through this wire and the ampere turns being no longer compensated, the transformer will insert its total inductance in the circuit.

It will therefore be arranged that the working, which is established in the circuit formed by the earthing, corresponds to a high permeability of the magnetic circuit of the transformer and that in consequence an inductance of great value is automatically inserted in the circuit.

For example, the transformer can be of such dimensions that the additional inductance $\omega L_a$ introduced would have ten times the value of $$\frac{1}{\omega C};$$

under these conditions the vector OE can never become greater than the value $\frac{1}{9} U$, that is to say that the excess voltage will be insignificant and that no other protection will be necessary.

Fig. 3 of the drawing shows how the vector diagram is modified in this case and it will be seen that the potential of the neutral point measured by the vector OE' has only undergone a slight modification.

The protective transformer of a given feeder is equal in dimensions to a transformer of a power half that of the feeder but it has an arrangement much more economical than an ordinary transformer, for during normal working there is hardly any flux in the iron.

It is to be noted that if, as has been stated above, the transformer in normal working only offers a reactance of a low value, this reactance is nevertheless useful in order to protect the alternator against short circuit between phases.

Another use of this transformer consists in the fact that it protects the feeder against accidents of putting into commission and allows the sudden putting into circuit of the feeder without having to fear excess voltages which would otherwise result. To attain this object it will be preferable to provide a switch with the different phase contacts displaced to close at different moments and in such a case the transformer will perform the function of choking coil of high impedance.

I declare that what I claim is:—

1. A protective device for polyphase alternating currents comprising an inductance connected in series with each phase, the inductances being so coupled as to limit automatically the capacity current upon the earthing of one of the phases and said inductances being ineffective during normal balanced working.

2. A protective device for polyphase alternating currents comprising a shell type core, an inductance connected in series with each of said phases and mounted on said core, the inductances being so coupled as to limit automatically the capacity current upon the earthing of one of the phases, said inductances being further ineffective during normal balanced working.

In witness whereof, I have hereunto signed my name this 15th day of July 1921, in the presence of two subscribing witnesses.

JOSEPH PERRET.

Witnesses:
ALPHONSE MÉJEAN,
J. LEE MURPHY.